United States Patent [19]

Martini et al.

[11] 3,953,285

[45] Apr. 27, 1976

[54] NICKEL-CHROMIUM-SILICON BRAZING FILLER METAL

[75] Inventors: Angelo J. Martini; Bruce R. Gourley, both of Pittsburgh, Pa.

[73] Assignee: The United States of America as represented by the United States Energy Research and Development Administration, Washington, D.C.

[22] Filed: Apr. 25, 1973

[21] Appl. No.: 354,267

[52] U.S. Cl. ................................. 176/66; 75/171; 176/79; 176/91 R
[51] Int. Cl.² .................................... G21C 3/02
[58] Field of Search .............. 75/171; 176/66, 79, 176/91 R

[56] References Cited
UNITED STATES PATENTS

| | | | |
|---|---|---|---|
| 2,245,566 | 6/1941 | Bolton | 75/171 |
| 2,821,474 | 1/1958 | Steinbach | 75/171 |
| 2,864,696 | 12/1958 | Foreman | 75/171 |
| 2,901,347 | 8/1959 | McGurty et al. | 75/171 |
| 2,923,621 | 2/1960 | Hoppin | 75/171 |
| 3,427,155 | 2/1964 | Fox et al. | 75/171 X |
| 3,574,612 | 4/1971 | Maness | 75/171 |

OTHER PUBLICATIONS

Robbins, W. P., MLM–1329, 5/10/67.
Henderson, J. G., Metallurgical Dictionary, pp. 350 and 44–45, Reinhold, N.Y. 1953.

*Primary Examiner*—Leland A. Sebastian
*Assistant Examiner*—R. E. Schafer
*Attorney, Agent, or Firm*—Dean E. Carlson; Richard A. Lambert

[57] ABSTRACT

A brazing filler metal containing, by weight percent, 23–35% chromium, 9–12% silicon, a maximum of 0.15% carbon, and the remainder nickel. The maximum amount of elements other than those noted above is 1.00%.

2 Claims, No Drawings

NICKEL-CHROMIUM-SILICON BRAZING FILLER METAL

BACKGROUND OF THE INVENTION

This invention was made in the course of, or under, a contract with the United States Atomic Energy Commission.

Our invention relates to brazing alloys and is particularly useful in brazing stainless steels and iron and nickel-base alloys used in nuclear reactors.

It is well known that suitable brazing filler metals, as distinguished from welding alloys, must possess properties including a melting temperature sufficiently below that of the base metals to be joined to preclude incipient melting and distortion of the base metals. These occurrences are unacceptable because incipient melting results in cracking and distortion makes it possible to meet the close dimensional tolerances associated with brazing applications.

In the development of the Light Water Breeder Reactor several commercial brazing filler metals were found which had suitable melting temperature (2075°F. to 2150°F.) and might appear satisfactory for brazing stainless steel members. It was discovered, however, that joints brazed with these alloys were subject to unacceptable corrosion in the pressurized water reactor environment. In particular, it has been found that AM-350 stainless steel joints brazed with commercial brazing filler metals such as those belonging to AWS classification BNi-5 (containing 19–20 w/o Cr, 9.75–10.5 w/o Si, balance nickel) exhibit unsatisfactory corrosion behavior. During our investigation of this matter, we discovered that the corrosion of brazements made with BNi-5 type filler metals in pressurized water reactor environments was due to the presence of a chromium-depleted phase (about 4.5–5 w/o Cr) in the brazement microstructure. Accordingly it became evident that the chromium content of the nickel-base brazing filler metal was critical. We discovered that the chromium-depleted phase was eliminated and the corrosion properties of the brazement were improved when the filler metal contained 23 to 35 w/o chromium. Chromium contents greater than 35 w/o Cr are undesirable because a brazing temperature higher than 2150°F. would be required to obtain the desired flow characteristics. It was also discovered that in order to maintain the melting point of the alloy within the acceptable range of 2075°–2150°F. it was necessary to restrict the silicon content to the narrow range of 9 to 12 w/o of the alloy. Deviation above or below this silicon range markedly increases the melting temperature and precludes use as a brazing filler metal below 2150° F.

Although Bolton, in U.S. Pat. No. 2,245,566, discloses a welding alloy composition having broad compositional ranges, it is clear he never contemplated its use as a brazing filler metal. It is evident that many compositions included within his compositional ranges would be inoperable in the context of our invention because their melting temperature would be outside of the range of our invention and/or they would contain insufficient chromium to preclude the presence of the corrodible chromium-depleted phase in the brazed joint.

SUMMARY OF THE INVENTION

It is an object of our invention to provide a corrosion-resistant braze filler metal.

It is a further object to provide brazed joints resistant to corrosion.

Other objects of our invention will become apparent through the following description and claims.

In accordance with our invention we have provided a braze alloy filler metal satisfying the foregoing objectives comprising, in weight percent,

| chromium | 23–35 w/o |
| silicon | 9–12 w/o |
| carbon | 0.15 w/o (maximum) |
| other elements | 1.00 w/o (maximum) |
| nickel | Remainder |

The foregoing components are melted together and may be formed into rods or other shapes according to methods well known in the prior art.

The braze filler metal of our invention demonstrates good flow, wetting, gap fill, and braze joint soundness properties when brazed at temperatures in the range of 2075°F. to 2150°F or, the same temperature range recommended for the commercial braze alloys. However, unlike those of commercial alloys, brazements made according to our invention exhibit no chromium-depleted phase under metallographic and electron microprobe analysis.

We have found that the foregoing objects are particularly well satisfied by the following composition:

| chromium | 29.0–31.0 w/o |
| silicon | 9.8–10.3 w/o |
| carbon | 0.15 w/o (maximum) |
| other elements | 1.00 w/o (maximum) |
| nickel | Balance |

Photomicrograph studies have shown that stainless steel joints brazed with the filler metals of our invention do not corrode after extended out-of-pile exposure in 600°F. pH 10.2 water or in 750°F. steam and 8000 ppm boron potassium tetraborate solution. In contrast, commercially available nickel-base brazing alloys containing 19 to 20 w/o Cr, and 9.75 to 10.5 Si exhibit a chromium-depleted phase and do corrode in these environments. Similar results were obtained after in-pile exposure for 1350 hours in LWBR Reference Water at 535°F. to 595°F.

Although the inventive alloys have been described with particular reference to LWBR applications, it is apparent they would also be useful in other pressurized water reactors and in any area where oxidation resistance is important. Structural components might well be fabricated from the alloy. It is foreseeable that they would also be useful in gas turbine applications.

We claim:

1. A corrosion resistant joint between AM-350 stainless steel fuel rod grid components which exhibits no chromium depleted phase comprising a brazement formed by brazing said components with a nickel-base brazing filler metal having a melting temperature within the range of 2075°F. to 2150°F. consisting essentially of, in weight percent, 23% to 35% chromium, 9% to 12% silicon, a maximum of 0.15% carbon, a maximum of 1.00% other elements and the balance nickel.

2. The joint of claim 1 wherein said brazing filler metal contains 29.0% to 31.0% chromium and 9.8% to 10.3% silicon.

* * * * *

UNITED STATES PATENT OFFICE
CERTIFICATE OF CORRECTION

Patent No. 3,953,285                    Dated April 27, 1976

Inventor(s) Angelo J. Martini and Bruce R. Gourley

It is certified that error appears in the above-identified patent and that said Letters Patent are hereby corrected as shown below:

In the United States Patent, Column 1, line 20, change "possible" to --impossible--

Signed and Sealed this

Seventeenth Day of August 1976

[SEAL]

Attest:

RUTH C. MASON
*Attesting Officer*

C. MARSHALL DANN
*Commissioner of Patents and Trademarks*